(12) United States Patent
Hatagishi et al.

(10) Patent No.: US 11,563,376 B2
(45) Date of Patent: Jan. 24, 2023

(54) POWER CONVERSION DEVICE (71) Applicant: DIAMOND & ZEBRA ELECTRIC MFG. CO., LTD., Osaka (JP)

(72) Inventors: Yukihiro Hatagishi, Osaka (JP); Shinnosuke Takenaka, Osaka (JP)

(73) Assignee: DIAMOND & ZEBRA ELECTRIC MFG. CO., LTD., Osaka (JP)

( * ) Notice: Subject to any disclaimer, the term of this patent is extended or adjusted under 35 U.S.C. 154(b) by 107 days.

(21) Appl. No.: 17/323,093

(22) Filed: May 18, 2021

(65) Prior Publication Data

US 2021/0408894 A1    Dec. 30, 2021

(30) Foreign Application Priority Data

Jun. 17, 2020 (JP) .............................. JP2020-104196

(51) Int. Cl.
  *H02M 3/158* (2006.01)
  *H02M 1/32* (2007.01)
  *H02M 7/217* (2006.01)
  *H02M 3/07* (2006.01)

(52) U.S. Cl.
  CPC ............ *H02M 3/158* (2013.01); *H02M 1/32* (2013.01); *H02M 7/217* (2013.01); *H02M 3/07* (2013.01)

(58) Field of Classification Search
  CPC .... H02J 3/1842; H02M 3/158; H02M 3/1582; H02M 1/15; H02M 1/007
  See application file for complete search history.

(56) References Cited

U.S. PATENT DOCUMENTS

| 9,906,119 | B2* | 2/2018 | Chen ...................... H02M 1/15 |
| 2013/0033910 | A1* | 2/2013 | Carletti ................... H02M 7/12 363/131 |
| 2013/0051096 | A1* | 2/2013 | Carletti ............... H02M 1/4225 363/84 |
| 2014/0369090 | A1* | 12/2014 | Ueki ................. H02M 7/53871 363/41 |
| 2015/0333616 | A1* | 11/2015 | Li ........................... H02M 1/15 713/300 |

(Continued)

OTHER PUBLICATIONS

Wang et al., "A Voltage Control Method for an Active Capacitive DC-link Module with Series-Connected Circuit", 2017 IEEE 3rd International Future Energy Electronics Conference and ECCE Asia, IFEEC—ECCE Asia, 2017, pp. 221-225.

*Primary Examiner* — Rafael O De Leon Domenech
(74) *Attorney, Agent, or Firm* — Birch, Stewart, Kolasch & Birch, LLP (57) ABSTRACT

A power conversion device suppresses voltage variation of a power supply bus. The device includes a variation compensation circuit and a control circuit. The variation compensation circuit includes: a first capacitor connected to the power supply bus; a second capacitor connected in series between the first capacitor and a ground; an auxiliary capacitor; and a converter including a switching element and having a voltage step-down function, the converter being connected to the second capacitor and the auxiliary capacitor. The control circuit includes an active power calculating section that calculates instantaneous active power ip in the variation compensation circuit. The control circuit controls the voltage Vc of the auxiliary capacitor using the instantaneous active power ip.

13 Claims, 9 Drawing Sheets

(56) References Cited

U.S. PATENT DOCUMENTS

| | | | |
|---|---|---|---|
| 2015/0372584 A1* | 12/2015 | Hirota | H02M 3/33584 363/37 |
| 2017/0279367 A1* | 9/2017 | Qiu | H02M 1/143 |
| 2019/0229609 A1* | 7/2019 | Li | H02J 1/02 |
| 2019/0252995 A1* | 8/2019 | Dai | H02M 3/158 |
| 2021/0351690 A1* | 11/2021 | Liu | H02M 1/32 |

* cited by examiner

POWER CONVERSION DEVICE

CROSS-REFERENCE TO RELATED APPLICATION

This application claims priority on and the benefit of Patent Application No. 2020-104196 filed in JAPAN on Jun. 17, 2020. The entire disclosures of this Japanese Patent Application are hereby incorporated by reference.

BACKGROUND OF THE INVENTION

Field of the Invention

The present invention relates to power conversion devices. In particular, the present invention relates to a device that suppresses voltage variation of a direct-current power supply bus in a power system involving conversion between a single-phase alternating current and a direct current.

Description of the Related Art

In recent years, the widespread use of high-capacity storage batteries and solar cells has led to an increasing demand for power supply systems involving conversion between a single-phase alternating current and a direct current. Examples of such power supply systems include charging systems for on-board storage batteries and household power supply systems employing storage batteries. In a charging system for an on-board storage battery, a single-phase alternating current supplied from an external power supply is converted to a direct current through an AC-to-DC converter and a power factor corrector (PFC). The direct current is converted to a desired voltage by a DC-to-DC converter, and the resulting direct current is delivered to the on-board storage battery. In a household power supply system employing a storage battery, a direct current supplied from the storage battery serving as a direct-current power supply is converted to a desired voltage by a DC-to-DC converter and further converted to a single-phase alternating current by an inverter.

In these power supply systems, an electrolytic capacitor having a high capacitance is commonly connected to a direct-current power supply bus to suppress voltage variation of the power supply bus. For example, an electrolytic capacitor is connected to a power supply bus connecting a PFC and a DC-to-DC converter or a power supply bus connecting a DC-to-DC converter and an inverter. Although electrolytic capacitors can have a higher capacitance than other kinds of capacitors, they have disadvantages such as a large volume leading to size increase of power supply systems and a short service life.

A power conversion device incorporating active power decoupling (APD) has been proposed as an alternative which can be used instead of electrolytic capacitors to achieve reduced size and increased service life of power supply systems. The device can suppress voltage variation by means of a low-capacitance capacitor, and thus allows for the use of a film or ceramic capacitor which has a small size and long service life. An example of this device is presented in "A Voltage Control Method for an Active Capacitive DC-link Module with Series-Connected Circuit", 2017 IEEE 3rd International Future Energy Electronics Conference and ECCE Asia, IFEEC—ECCE Asia, Page 221-225 (hereinafter referred to as Document 1).

The device of Document 1 is made up of a variation compensation circuit and a control circuit. The variation compensation circuit includes a first capacitor connected to a power supply bus, a second capacitor connected in series to the first capacitor, and an auxiliary capacitor. The auxiliary capacitor and second capacitor are connected via an inverter. The variation compensation circuit sends a power supply bus voltage and an auxiliary capacitor voltage to the control circuit. The control circuit sends to the variation compensation circuit a PWM signal for turning on and off a switching element of the inverter. The control circuit changes the duty cycle of the PWM signal to adjust the auxiliary capacitor voltage to a predetermined target voltage and allow the second capacitor to have a voltage suitable for compensating for variation of the power supply bus voltage. After the change in duty cycle, the variation compensation circuit feeds back the resulting power supply bus voltage and auxiliary capacitor voltage to the control circuit. This process is repeated to suppress voltage variation of the power supply bus. The variation compensation circuit and the control circuit constitute a feedback control system.

For the device of Document 1 to reliably compensate for the power supply voltage variation, it is important to control the voltage of the auxiliary capacitor so as to reduce the difference between this voltage and the target voltage. However, the voltage control of the auxiliary capacitor is a non-linear model. The voltage of the auxiliary capacitor is likely to oscillate if a typical existing control technique such as proportional integral control (PI control) is used for the voltage control of the auxiliary capacitor. This makes it difficult to reliably suppress the voltage variation of the power supply bus.

An object of the present invention is to provide a power conversion device incorporating APD, the device being adapted to reliably suppress voltage variation of a power supply bus.

SUMMARY OF THE INVENTION

The present invention relates to a power conversion device that suppresses voltage variation of a direct-current power supply bus in a power system involving conversion between a single-phase alternating current and a direct current. The device includes a variation compensation circuit and a control circuit. The variation compensation circuit includes: a first capacitor C1 connected to the power supply bus; a second capacitor C2 connected in series between the first capacitor C1 and a ground; an auxiliary capacitor Cc; a converter including a switching element and having a voltage step-down function, the converter being connected to the second capacitor C2 and the auxiliary capacitor Cc; a first voltmeter that measures a voltage Vd of the power supply bus; a second voltmeter that measures a voltage Vc of the auxiliary capacitor Cc; and an ammeter that measures an output current Ia of the converter. The control circuit receives the voltage Vd, the voltage Vc, and the current Ia as inputs, and generates a switch control signal for controlling turning on and off of the switching element to adjust the voltage Vd to a predetermined target voltage VD and the voltage Vc to a predetermined target voltage VC. The control circuit includes an active power calculating section that calculates instantaneous active power ip in the variation compensation circuit. The control circuit controls the voltage Vc using the instantaneous active power ip.

The present inventors have focused on the fact that active power in the variation compensation circuit is associated with charge and discharge of the auxiliary capacitor. The present inventors have found that the use of the instantaneous active power in the variation compensation circuit for voltage control of the auxiliary capacitor enables an existing control technique such as PI control to reliably control the voltage of the auxiliary capacitor while suppressing oscillation.

In the power conversion device according to the present invention, the control circuit includes the active power calculating section that calculates the instantaneous active power ip in the variation compensation circuit. The voltage Vc of the auxiliary capacitor is controlled using the instantaneous active power ip. The device can reliably suppress voltage variation of the power supply bus.

Preferably, the control circuit includes: a pq calculating section that calculates the instantaneous active power ip and instantaneous reactive power iq in the variation compensation circuit based on the voltage Vd and the current Ia; a Pp determining section that determines instantaneous active power Pp as an intermediate manipulated variable based on the instantaneous active power ip, the voltage Vc, and the target voltage VC, the instantaneous active power Pp being for adjusting the voltage Vc to the target voltage VC; and a Qp determining section that determines instantaneous reactive power Qp as an intermediate manipulated variable, the instantaneous reactive power Qp being for adjusting the instantaneous reactive power iq to zero, and the control circuit generates the switch control signal based on the instantaneous active power Pp and the instantaneous reactive power Qp.

Preferably, the control circuit further includes: an IA calculating section that calculates an output current IA of the converter based on the instantaneous active power Pp and the instantaneous reactive power Qp; a V2p determining section that determines a voltage V2p of the second capacitor C2 as an intermediate manipulated variable based on the calculated current IA and the current Ia, the voltage V2p being for adjusting a difference between the currents IA and Ia to zero; and a switch control signal generating section that generates the switch control signal based on the voltage V2p and the voltage Vc.

Preferably, the V2p determining section includes a proportional resonant control section having a peak gain for variation with a frequency $\omega_0$ which is twice a frequency of the single-phase alternating current.

Preferably, the control circuit further includes an oscillation frequency component reducing circuit that reduces the amount of a component with an oscillation frequency which depends on the second capacitor C2 and the converter, the current Ia coming from the variation compensation circuit is passed through the reducing circuit, and an output from the reducing circuit is used as the current Ia to generate the switch control signal.

Preferably, the reducing circuit is a notch filter or a second order generalized integrator.

Preferably, the converter is an inverter or a step-down chopper.

The present invention relates to a method of controlling a variation compensation circuit for a power conversion device that suppresses voltage variation of a direct-current power supply bus in a power system involving conversion between a single-phase alternating current and a direct current. The variation compensation circuit includes: a first capacitor C1 connected to the power supply bus; a second capacitor C2 connected in series between the first capacitor C1 and a ground; an auxiliary capacitor Cc; a converter including a switching element and having a voltage step-down function, the converter being connected to the second capacitor C2 and the auxiliary capacitor Cc; a first voltmeter that measures a voltage Vd of the power supply bus; a second voltmeter that measures a voltage Vc of the auxiliary capacitor Cc; and an ammeter that measures an output current Ia of the converter. The method includes the steps of:

(A) receiving the voltage Vd, the voltage Vc, and the current Ia as inputs; and (B) generating a switch control signal for controlling turning on and off of the switching element to adjust the voltage Vd to a predetermined target voltage VD and the voltage Vc to a predetermined target voltage VC.

In the step (B), instantaneous active power ip in the variation compensation circuit is calculated based on the voltage Vd and the current Ia, and the voltage Vc is controlled using the instantaneous active power ip.

Preferably, the step (B) includes the steps of:

(B1) calculating the instantaneous active power ip in the variation compensation circuit based on the voltage Vd and the current Ia;

(B2) determining instantaneous active power Pp as an intermediate manipulated variable based on the instantaneous active power ip, the voltage Vc, and the target voltage VC, the instantaneous active power Pp being for adjusting the voltage Vc to the target voltage VC;

(B3) calculating instantaneous reactive power iq in the variation compensation circuit based on the voltage Vd and the current Ia; and (B4) determining instantaneous reactive power Qp as an intermediate manipulated variable based on the instantaneous reactive power iq, the instantaneous reactive power Qp being for adjusting the instantaneous reactive power iq to zero, and the switch control signal is generated based on the instantaneous active power Pp and the instantaneous reactive power Qp.

Preferably, the step (B) further includes the steps of:

(B5) calculating an output current IA of the converter based on the instantaneous active power Pp and the instantaneous reactive power Qp;

(B6) determining a voltage V2p of the second capacitor C2 as an intermediate manipulated variable based on the calculated current IA and the current Ia, the voltage V2p being for adjusting a difference between the currents IA and is to zero; and (B7) generating the switch control signal based on the voltage V2p and the voltage Vc.

Preferably, in the step (B6), proportional resonant control is performed, and the proportional resonant control has a peak gain for variation with a frequency $\omega_0$ which is twice a frequency of the single-phase alternating current.

Preferably, the method further includes the step of:

(C) after receiving the current Ia as an input in the step (A), passing the received current Ia through an oscillation frequency component reducing circuit that reduces the amount of a component with an oscillation frequency which depends on the second capacitor C2 and the converter, and in the step (B), the current passed through the reducing circuit is used as the current Ia.

Preferably, the oscillation frequency component reducing circuit is a notch filter or a second order generalized integrator.

DESCRIPTION OF THE PREFERRED EMBODIMENTS

The following will describe in detail the present invention based on preferred embodiments with appropriate reference to the drawings.

Figure 1:
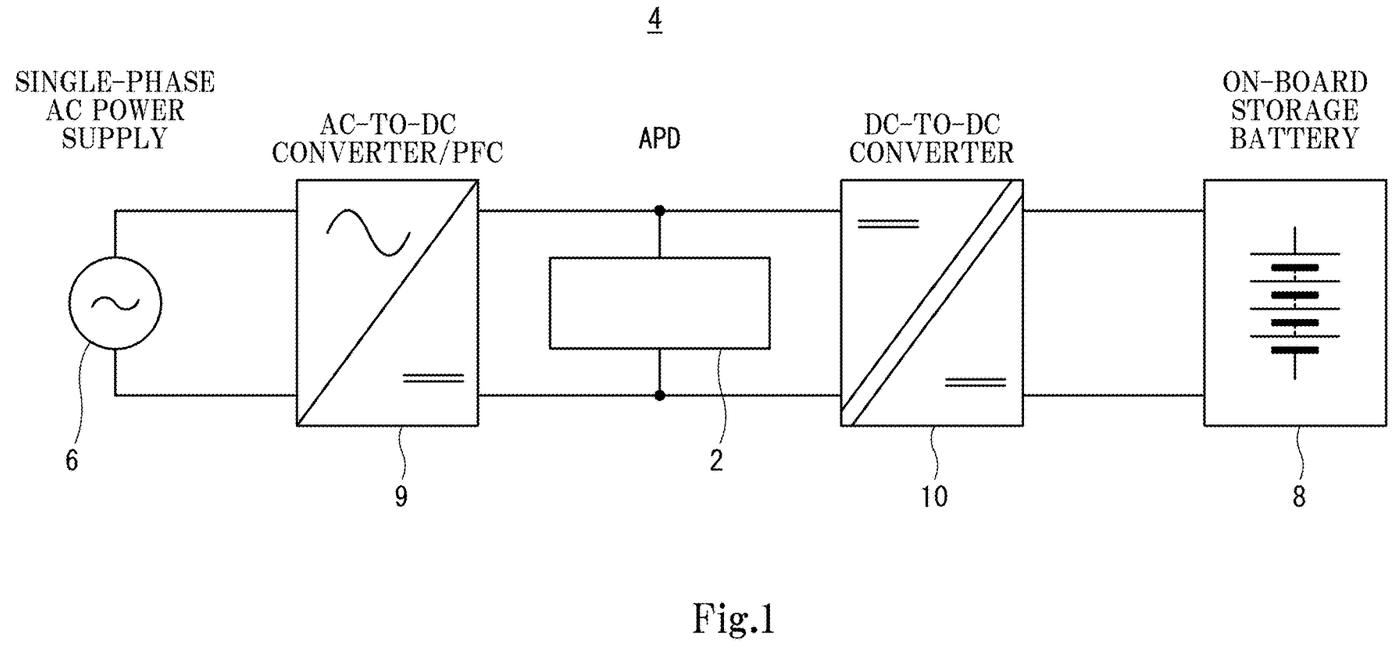
FIG. 1 is a block diagram showing an example of a power supply system employing a power conversion device according to the present invention.

A power conversion device 2 according to the present invention is for use in a power system using a single-phase alternating current. The power conversion device 2 is connected to a direct-current power supply bus in a power supply system involving conversion between a single-phase alternating current and a direct current. The power conversion device 2 incorporates active power decoupling and suppresses voltage variation of the direct-current power supply bus. FIG. 1 shows a power system 4 employing the power conversion device 2. In this figure, the power conversion device 2 is shown as "APD".

The power system 4 of FIG. 1 is a system in which an on-board storage battery 8 is charged with electric power supplied from an external single-phase alternating-current power supply 6. A single-phase alternating current is converted to a direct current through an AC-to-DC converter and a power factor corrector 9 (PFC 9), then the direct current is further converted to a desired voltage by a DC-to-DC converter 10, and the resulting direct current is delivered to the on-board storage battery 8. In this embodiment, the device 2 is connected to a power supply bus connecting the PFC 9 and the DC-to-DC converter 10. Although not illustrated, an example of other power supply systems in which the device 2 can be used is a household single-phase alternating-current power supply system employing a storage battery. In the household power supply system, the device 2 is connected to a power supply bus connecting a DC-to-DC converter and an inverter.

First Embodiment

Figure 2:
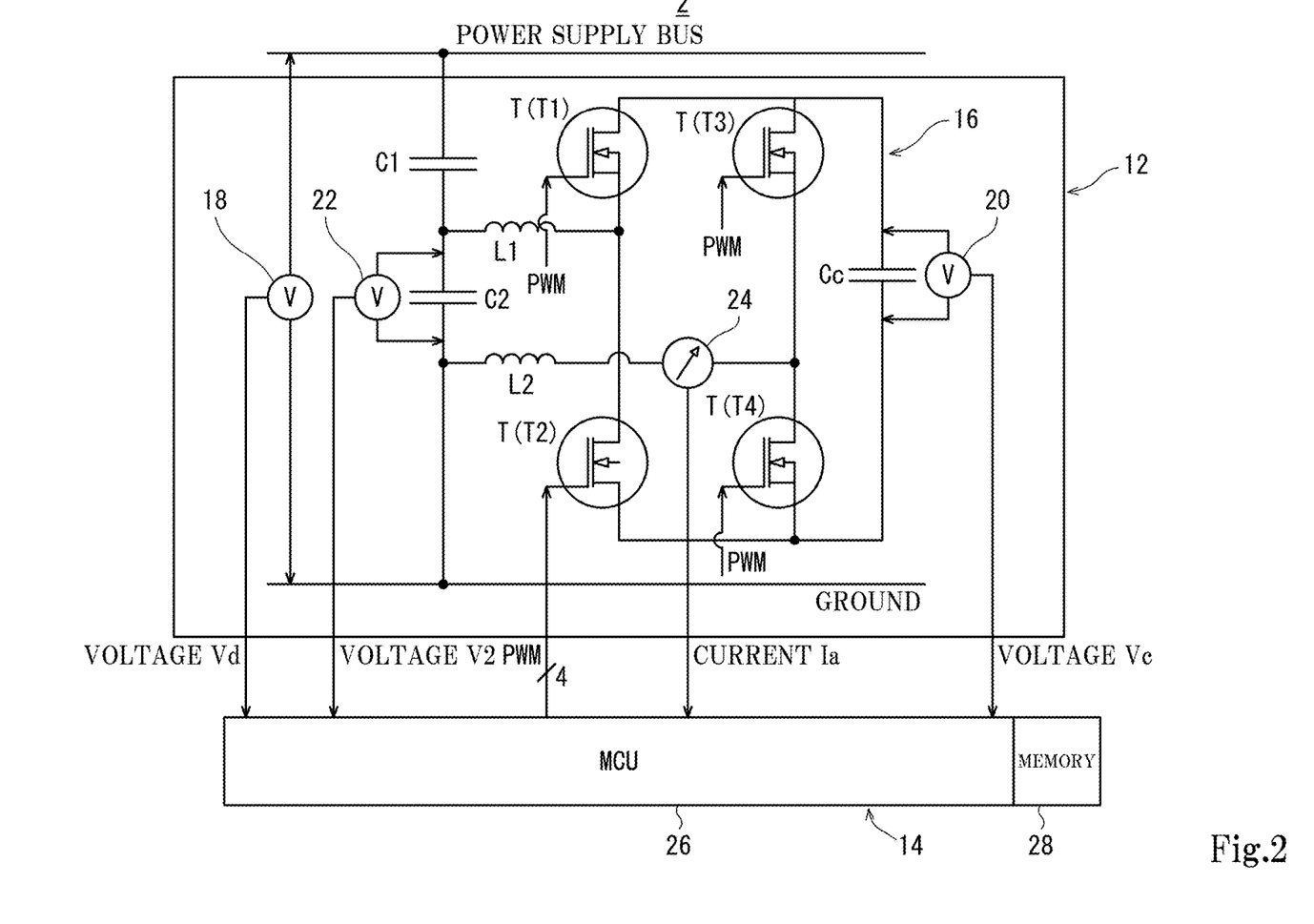
FIG. 2 is a circuit diagram showing a power conversion device according to an embodiment of the present invention.

FIG. 2 is a circuit diagram showing the power conversion device 2 according to an embodiment of the present invention. As shown in the figure, the device 2 includes a variation compensation circuit 12 and a control circuit 14.

The variation compensation circuit 12 is connected to a power supply bus. As shown in FIG. 2, the variation compensation circuit 12 includes a first capacitor C1, a second capacitor C2, an auxiliary capacitor Cc, a converter 16, a first voltmeter 18, a second voltmeter 20, a third voltmeter 22, and an ammeter 24.

The first capacitor C1 has one end connected to the power supply bus and the other end connected to the second capacitor C2. The second capacitor C2 is inserted in series between the first capacitor C1 and a ground. The converter 16 is connected to the second capacitor C2 and the auxiliary capacitor Cc. The converter 16 includes two input terminals and two output terminals. Each input terminal is connected to a corresponding one of the terminals of the auxiliary capacitor Cc, and each output terminal is connected to a corresponding one of the terminals of the second capacitor C2.

The converter 16 includes a switching element T. In this embodiment, the converter 16 is configured as an inverter including four switching elements T1, T2, T3, and T4 and two inductors L1 and L2. Each switching element T is configured as a MOSFET. Each switching element T may be configured as another kind of switching element such as an IGBT, a JFET, or an HFET. To the gate of each switching element T is connected a switch control signal provided from the control circuit 14. In this embodiment, a pulse width modulation (PWM) signal provided from the control circuit 14 is connected to the gate of each switching element T. The ratio between the turning-on and turning-off periods of the switching element T depends on the duty cycle of the PWM signal. The voltage V2 of the second capacitor C2 can be stepped down below the voltage Vc of the auxiliary capacitor Cc by the converter 16. The amount of step-down of the voltage V2 relative to the voltage Vc can be controlled as a function of the duty cycle of the PWM signal.

As described above, the second capacitor C2 is connected in series between the power supply bus and the ground, with the first capacitor C1 interposed between the second capacitor C2 and the power supply bus. The voltage V2 of the second capacitor C2 is controlled by the PWM signal so as to compensate for the variation of the voltage Vd of the power supply bus, and thereby the variation of the voltage Vd of the power supply bus can be suppressed.

In the variation compensation circuit 12, charge and discharge of the auxiliary capacitor Cc is effected by the variation of the voltage Vd of the power supply bus through the converter 16. The voltage Vc of the auxiliary capacitor Cc can be varied as a function of the duty cycle of the PWM signal.

The switch control signal need not be the PWM signal. The switch control signal may be a pulse density modulation (PDM) signal. The switch control signal may be any kind of signal insofar as the ratio between the turning-on and turning-off periods of the switching element T (the ratio between the H and L periods of the switch control signal) can be varied to control the voltage V2 of the second capacitor C2.

In this embodiment, as described above, the converter 16 is embodied as an inverter. The converter 16 need not be embodied as an inverter. The converter 16 may be any kind of circuit that is able to control the amount of step-down of the voltage V2 relative to the voltage Vc. The converter 16 may be embodied, for example, as a step-down chopper.

The first voltmeter 18 measures the voltage Vd of the power supply bus. The second voltmeter 20 measures the voltage Vc of the auxiliary capacitor Cc. The third voltmeter 22 measures the voltage V2 of the second capacitor C2. The ammeter 24 measures an output current Ia of the converter 16. The measured voltage Vd, voltage Vc, voltage V2, and current Ia are sent to the control circuit 14.

In this embodiment, as shown in FIG. 2, the control circuit 14 includes a processor (MCU) 26, a memory 28, and a non-illustrated program. The program is stored in the memory 28. The control circuit 14 receives the voltage Vd, voltage Vc, and current Ia as inputs from the variation compensation circuit 12. The control circuit 14 generates a switch control signal for controlling turning on and off of the switching element T of the variation compensation circuit 12. In this embodiment, the control circuit 14 generates a PWM signal as the switch control signal. The control circuit 14 receives the voltages Vd and Vc as inputs from the variation compensation circuit 12 and provides the variation compensation circuit 12 with the switch control signal as a manipulated variable for adjusting each of the voltages Vd and Vc to a target voltage. The control circuit 14 and the variation compensation circuit 12 constitute a feedback control system.

Figure 3:
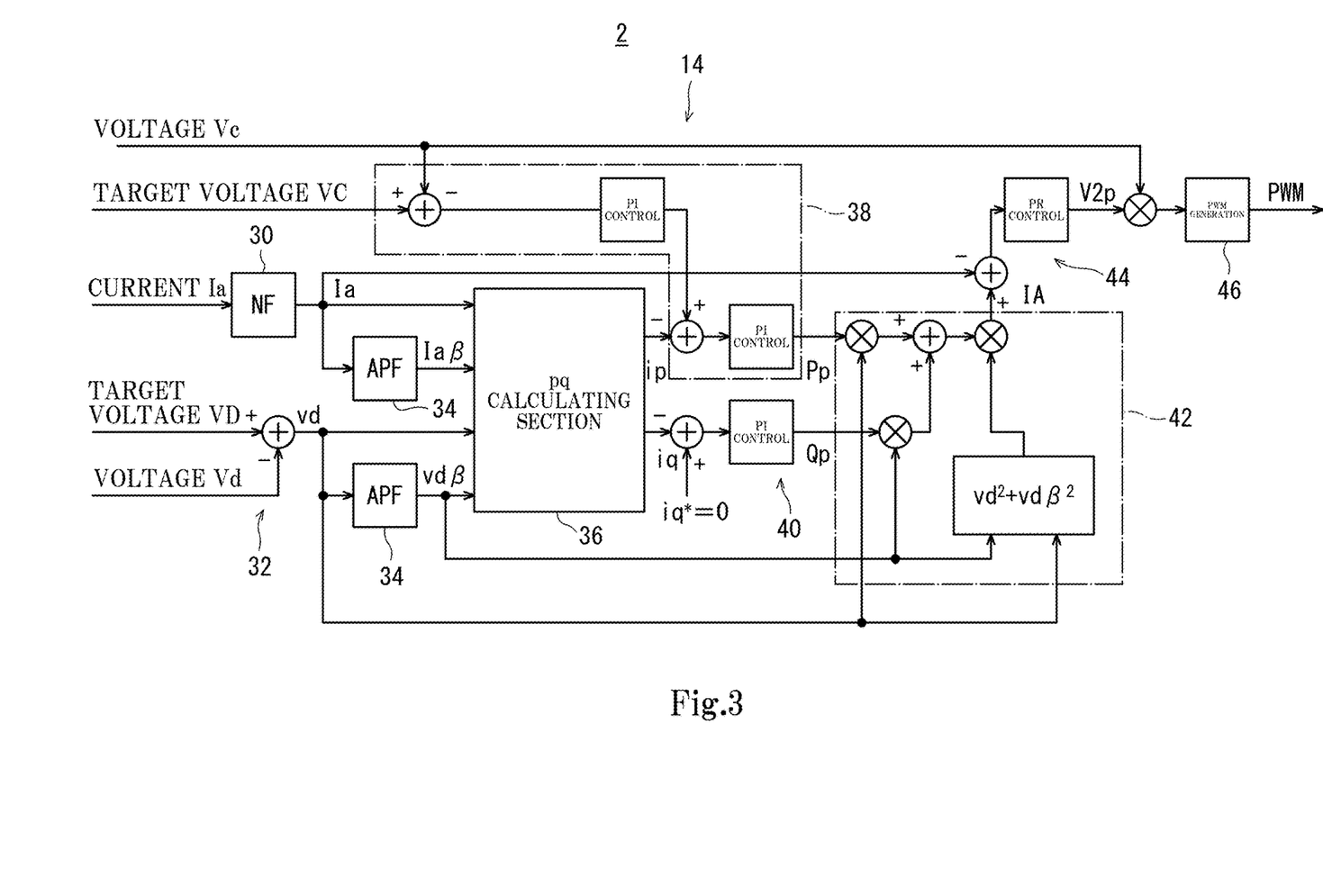
FIG. 3 is a block diagram showing the operation of a control circuit of the device of FIG. 2.

FIG. 3 is a block diagram illustrating the function of the control circuit 14. The control circuit 14 receives a predetermined target voltage VD of the power supply bus and a predetermined target voltage VC of the auxiliary capacitor Cc as inputs in addition to the voltage Vd, voltage Vc, and current Ia sent from the variation compensation circuit 12. As seen from FIG. 3, the control circuit 14 includes a notch filter 30 (NF 30), a variation component voltage extracting section 32 (vd extracting section 32), an all-pass filter 34 (APF 34), an instantaneous active/reactive power calculating section 36 (pq calculating section 36), a section 38 for determining instantaneous active power as an intermediate manipulated variable (Pp determining section 38), a section 40 for determining instantaneous reactive power as an intermediate manipulated variable (Qp determining section 40), a section 42 for calculating a converter output current (IA calculating section 42), a section 44 for determining a voltage of the second capacitor C2 as an intermediate manipulated variable (V2p determining section 44), and a section 46 for generating a PWM signal as a final manipulated variable (PWM generating section 46).

The voltage V2 of the second capacitor C2 as measured by the third voltmeter 22 is not used in the process performed by the control circuit 14. The voltage measured by the third voltmeter 22 is used in an evaluation test to examine the voltage V2 of the second capacitor C2. The voltage V2 is therefore not shown in FIG. 3.

In this embodiment, the constituting parts of the control circuit 14 are not embodied as the corresponding dedicated circuits, but are embodied by the MCU 26 operated by the program. A part of the control circuit 14 may be embodied as a dedicated circuit. For example, the NF 30 may be embodied as a dedicated circuit, and the other parts of the control circuit 14 may be embodied by the MCU 26 operated by the program. The APF 34 may be embodied as a dedicated circuit, and the other parts of the control circuit 14 may be embodied by the MCU 26 operated by the program. All the parts of the control circuit 14 may be embodied as dedicated circuits.

The NF 30 is a filter having a lower gain at a particular frequency than at the other frequencies. The NF 30 is configured to have a low gain at an oscillation frequency Fo which depends on the second capacitor C2 and inductors L1 and L2. The NF 30 is an oscillation frequency component reducing circuit that reduces the amount of a component with the frequency Fo. In this embodiment, the current Ia coming from the variation compensation circuit 12 is passed through the NF 30. The output current of the NF 30 contains a smaller amount of the component with the frequency Fo than the input current Ia. The output current of the NF 30 is not the same as the input current Ia. However, in the present specification, the input current Ia and the output current of the NF 30 are not differentiated unless such differentiation is necessary. The output current of the NF 30 is described as the current Ia.

The vd extracting section 32 calculates a difference between the measured voltage Vd of the power supply bus and the target voltage VD of the power supply bus. Thus, a variation voltage vd is obtained. The variation voltage vd is a component corresponding to the variation of the voltage Vd of the power supply bus from the target voltage VD.

The APF 34 is a filter that shifts the phase of a signal having a given frequency without changing the amplitude of the signal. The APF 34 is designed to shift the phase of a signal having a frequency $\omega_0$ by $-90°$ (retard the phase by $90°$). The frequency $\omega_0$ is twice the frequency of a single-phase alternating current used in a power supply system. In a single-phase alternating-current power supply system, the instantaneous power varies with the frequency $\omega_0$. Thus, the variation voltage vd and the current Ia are each composed predominantly of a component with the frequency $\omega_0$. As shown in FIG. 3, the variation voltage vd is passed through the APF 34, and thus a voltage vdβ phase-shifted from the voltage vd by $-90°$ is output. Further, the current Ia is passed through the APF 34, and thus a current Iaβ phase-shifted from the current Ia by $-90°$ is output.

The pq calculating section 36 calculates instantaneous active power ip and instantaneous reactive power iq in the variation compensation circuit 12 which are generated by voltage variation of the power supply bus. Since the voltage vdβ and the current Iaβ have been obtained, the instantaneous active power ip and the instantaneous reactive power iq can be calculated by the following equations.

Instantaneous active power $ip = vd*Ia + vdβ*Iaβ$

Instantaneous reactive power $iq = vd*Iaβ + vdβ*Ia$

Figure 4:
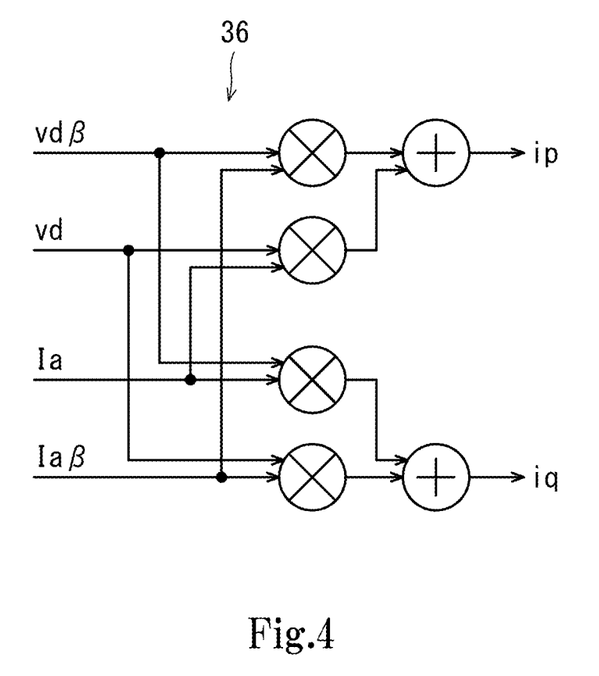
FIG. 4 is a block diagram showing the operation of a part of the control circuit of FIG. 3.

FIG. 4 illustrates the operation performed by the pq calculating section 36 using the above equations.

The Pp determining section 38 determines instantaneous active power Pp as an intermediate manipulated variable based on the measured voltage Vc of the auxiliary capacitor Cc, the target voltage VC of the auxiliary capacitor Cc, and the instantaneous active power ip. The instantaneous active power Pp is for adjusting the voltage of the auxiliary capacitor Cc to the voltage VC. As shown in FIG. 3, the Pp determining section 38 performs first proportional integral control (PI control) to determine a first intermediate manipulated variable Pp1 based on the difference between the voltages Vc and VC. The Pp determining section 38 performs second PI control to determine the instantaneous active power Pp as an intermediate manipulated variable based on the difference between the first intermediate manipulated variable Pp1 and the instantaneous active power ip calculated by the pq calculating section 36. The Pp determining section 38 uses the instantaneous active power ip to control the voltage of the auxiliary capacitor Cc.

In the present specification, an "intermediate manipulated variable" refers to a manipulated variable which is an output of the PI control, I control described below, or PR control described below and which is used to generate a PWM signal as a final manipulated variable to be provided to the variation compensation circuit 12.

A control technique other than the PI control may be used to determine the instantaneous active power Pp as an intermediate manipulated variable. For example, integral control (I control) may be used instead of the first PI control, and I control may be used instead of the second PI control.

The Qp determining section 40 performs PI control to determine instantaneous reactive power Qp as an intermediate manipulated variable with the goal of adjusting the instantaneous reactive power iq to zero. Adjusting the instantaneous reactive power iq to zero leads to a reduction in the variation voltage vd. Thus, the variation of the voltage Vd of the power supply bus is suppressed. A control technique other than the PI control may be used for determination of the instantaneous reactive power Qp. For example, I control may be used instead of the PI control.

The IA calculating section 42 uses the following equation to calculate a converter output current IA based on the instantaneous active power Pp and the instantaneous reactive power Qp.

$$IA=(Pp*vd+Qp*vd\beta)/(vd^2+vd\beta^2)$$

FIG. 3 illustrates the operation performed by the IA calculating section 42 using the above equation.

The V2p determining section 44 determines a voltage V2p of the second capacitor C2 as an intermediate manipulated variable based on the measured converter output current Ia and the converter output current IA determined by the above calculation. The voltage V2p is for adjusting the difference between the currents Ia and IA to zero. As shown in FIG. 3, the V2p determining section 44 includes a proportional resonant control section (PR control section). The V2p determining section 44 performs proportional resonant control (PR control) to determine the voltage V2p based on the difference between the currents Ia and IA.

A transfer function Gi(s) of the PR control section is expressed as follows.

$$G_i(s) = k_p + k_r \frac{s}{s^2 + \omega_0^2} + \sum_h \frac{k_{rh}s}{s^2 + (h\omega_0)^2}$$

In the function Gi(s), the first term is a proportional term, and $k_p$ is a proportionality constant. The second term is a resonant term for the frequency $\omega_0$ described above, and $k_r$ is a proportionality constant. The third term is a resonant term for a frequency $h*\omega_0$ which is an integral multiple of the frequency $\omega_0$ (h is an integer of 2 or more). The required value or type of h (e.g., h=3, 5, 7) depends, for example, on the intended performance. The third term may be eliminated. In this embodiment, the transfer function Gi(s) of the PR control section does not include the third term. In this embodiment, the transfer function Gi(s) of the PR control section consists of the proportional term and the resonant term for the frequency $\omega_0$.

Figure 5:
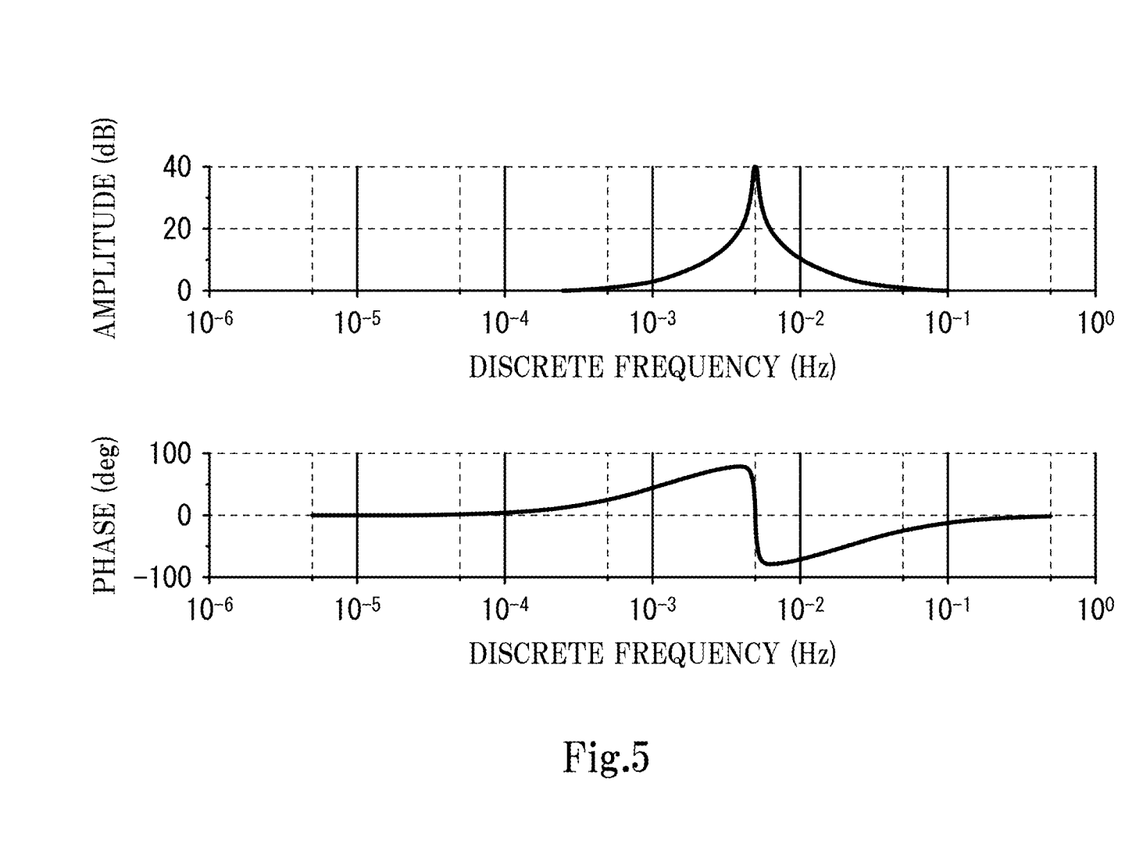
FIG. 5 is a Bode plot showing the frequency response of a proportional resonant control section of the control circuit of FIG. 3.

FIG. 5 is a Bode plot showing the frequency response of the PR control section. The PR control section has a peak gain for variation with the frequency $\omega_0$. The PR control section has a high gain for variation with the frequency $\omega_0$. In FIG. 5, the abscissa represents the discrete frequency. The discrete frequency is equal to the frequency of the signal divided by the sampling frequency (the frequency in sampling performed to process the signal by the MCU 26 configured as a digital circuit). In this embodiment, the sampling frequency is 20 kHz. The PR control section has a peak gain for variation with a frequency $\omega_0$ of 100 Hz.

A control technique other than the PR control may be used for determination of the voltage V2p. For example, PI control may be used instead of the PR control.

The PWM generating section 46 determines the duty cycle of a PWM signal based on the voltage V2p determined as an intermediate manipulated variable and the voltage Vc of the auxiliary capacitor Cc. The duty cycle is determined based on the ratio between the voltage V2p and the voltage Vc. A PWM signal with this duty cycle is generated. The PWM signal is sent as a manipulated variable of the feedback control to the variation compensation circuit 12.

The following will describe the method used by the control circuit 14 of the device 2 to control the variation compensation circuit 12.

The method used by the control circuit 14 to control the variation compensation circuit 12 includes the steps of: receiving the voltage Vd, the voltage Vc, and the current Ia as inputs; and generating the switch control signal. The switch control signal controls the turning-on and off of the switching element to adjust the voltage Vd to the predetermined target voltage VD and the voltage Vc to the predetermined target voltage VC. In this embodiment, the switch control signal is a PWM signal.

The step of generating the switch control signal includes the steps of:

(1) passing the current Ia through the NF 30;

(2) passing the current Ia through the APF 34 after passing of the current Ia through the NF 30;

(3) obtaining the variation voltage vd of the power supply bus;

(4) passing the variation voltage vd through the APF 34;

(5) calculating the instantaneous active power ip;

(6) determining the instantaneous active power Pp as an intermediate manipulated variable;

(7) calculating the instantaneous reactive power iq;

(8) determining the instantaneous reactive power Qp as an intermediate manipulated variable;

(9) calculating the output current IA of the converter 16;

(10) determining the voltage V2p of the second capacitor C2 as an intermediate manipulated variable; and (11) generating the PWM signal.

The steps (1) to (11) need not be performed in this order. If a signal needed to perform one step is generated in another step, the other step of generating the signal should precede the one step in which the signal is used. With the exception of such cases, the steps may be performed in any order. For example, the steps (1) and (2) need to be performed in this order. The steps (3) and (4) need to be performed in this order. The steps (1) and (2) may precede the steps (3) and (4), and vice versa. The steps (1) and (2) may be performed concurrently with the steps (3) and (4). The steps (5) and (6) need to be performed in this order. The steps (7) and (8) need to be performed in this order. The steps (5) and (6) may precede the steps (7) and (8), and vice versa. The steps (5) and (6) may be performed concurrently with the steps (7) and (8). The step (9) needs to be performed after the steps (1) to (8), and the steps (9) to (11) need to be performed in this order.

In the step (1), the current Ia coming from the variation compensation circuit 12 is passed through the NF 30. In the step (2), the current Ia passed through the NF 30 is passed through the APF 34 to obtain the current Iaβ phase-shifted from the current Ia by −90°.

In the step (3), the difference between the measured voltage Vd of the power supply bus and the target voltage VD of the power supply bus is calculated to obtain the variation voltage vd. In the step (4), the variation voltage vd is passed through the APF 34 to obtain the voltage vdβ phase-shifted from the variation voltage vd by −90°.

In the step (5), the following equation is used to calculate the instantaneous active power ip based on the current Iaβ, voltage vdβ, current Ia, and variation voltage vd which have been obtained in the previous steps.

$$\text{Instantaneous active power } ip = vd*Ia + vd\beta*Ia\beta$$

In the step (6), the first PI control is performed to determine the first intermediate manipulated variable Pp1 based on the difference between the voltage Vc and the target voltage VC. The first intermediate manipulated variable Pp1 is for adjusting the voltage Vc to the target voltage VC. Subsequently, the second PI control is performed to determine the instantaneous active power Pp as an intermediate manipulated variable based on the difference between the first intermediate manipulated variable Pp1 and the instantaneous active power ip calculated in the step (5). The instantaneous active power Pp is for adjusting the difference to zero.

In the step (7), the following equation is used to calculate the instantaneous reactive power iq based on the current Iaβ, voltage vdβ, current Ia, and variation voltage vd which have been obtained in the previous steps.

$$\text{Instantaneous reactive power } iq = vd*Ia\beta + vd\beta*Ia$$

In the step (8), PI control is performed to determine the instantaneous reactive power Qp as an intermediate manipulated variable. The instantaneous reactive power Qp is for adjusting the instantaneous reactive power iq to zero. Adjusting the instantaneous reactive power iq to zero leads to a reduction in the variation voltage vd.

In the step (9), the following equation is used to calculate the converter output current IA based on the voltages Vd and vdβ and the instantaneous active power Pp and instantaneous reactive power Qp which have been determined as intermediate manipulated variables.

$$IA = (Pp*vd + Qp*vd\beta)/(vd^2 + vd\beta^2)$$

In the step (10), PR control is performed to determine the voltage V2p as an intermediate manipulated variable based on the measured converter output current Ia and the calculated converter output current IA. The voltage V2p is for adjusting the difference between the currents Ia and IA to zero.

In the step (11), the duty cycle of the PWM signal is updated based on the voltage V2p and the voltage Vc of the auxiliary capacitor Cc. The value to which the duty cycle is updated is determined based on the ratio between the voltage V2p and the voltage Vc. The PWM signal having the updated duty cycle is sent as a manipulated variable to the variation compensation circuit 12.

The variation compensation circuit 12 measures the voltage Vd, voltage Vc, and current Ia generated under control of the updated PWM signal. The voltage Vd, voltage Vc, and current Ia are fed back to the control circuit 14, by which the steps (1) to (11) are performed again. This process is repeated.

The following will describe the advantages of the present invention.

The device 2 according to the present invention is a power conversion device incorporating APD. The device 2 can suppress voltage variation of a power supply bus by means of a low-capacitance capacitor, and thus allows for the use of a film or ceramic capacitor which has a small size and long service life. A power supply system employing the device 2 can have a smaller size and longer service life than conventional power supply systems employing electrolytic capacitors.

In order that the variation compensation circuit 12 incorporating APD may reliably compensate for the power supply voltage variation, it is important to control the voltage of the auxiliary capacitor Cc so as to reduce the difference between the voltage of the auxiliary capacitor Cc and the target voltage. However, the voltage control of the auxiliary capacitor Cc is a non-linear model. The voltage of the auxiliary capacitor Cc is likely to oscillate if a typical existing control technique such as PI control is used for the voltage control of the auxiliary capacitor Cc.

In the device 2, the control circuit 14 controls the voltage Vc of the auxiliary capacitor Cc using the instantaneous active power ip in the variation compensation circuit 12. The active power in the variation compensation circuit 12 is associated with charge and discharge of the auxiliary capacitor Cc. The use of the instantaneous active power in the variation compensation circuit 12 for voltage control of the auxiliary capacitor Cc enables an existing control technique such as PI control to reliably control the voltage of the auxiliary capacitor Cc while suppressing oscillation. The device 2 can reliably suppress the variation of the voltage Vd of the power supply bus.

The control coefficients such as the time constant for the voltage control of the auxiliary capacitor Cc are difficult to set since the voltage control is a non-linear model. The designer determines the control coefficients through brute-force trial and error. This renders it difficult to design a power conversion device incorporating APD.

The device 2, which uses the instantaneous active power ip for the voltage control of the auxiliary capacitor, allows for determining the control coefficients for the voltage control of the auxiliary capacitor Cc with little influence on other control such as that performed by the PR control section. With the device 2, brute-force trial and error can be avoided in setting of the control coefficients. The designing of the device 2 can be efficiently accomplished.

In the device 2, the instantaneous active power ip and instantaneous reactive power iq in the variation compensation circuit 12 are calculated based on the voltage Vd of the power supply bus and the output current Ia of the converter 16. The voltage of the auxiliary capacitor Cc is controlled based on the voltage Vc of the auxiliary capacitor Cc and the instantaneous active power ip. The device 2 controls the variation voltage vd of the power supply bus based on the instantaneous reactive power iq to reduce the variation voltage vd. The device 2 does not require to measure any current supplied from the power supply bus. The device 2 eliminates the need for an external sensor. The device 2 can be used by connecting it to the power supply bus, and the use of the device 2 does not affect the configuration of the other parts of the power supply system.

In this embodiment, as described above, PR control having a peak gain for variation with the frequency $\omega_0$ is used as a control technique for determining the voltage V2p based on the difference between the currents Ia and IA. In a single-phase alternating-current power supply system, the instantaneous power varies with the frequency $\omega_0$, and thus the current Ia is composed predominantly of a sinusoidal component with the frequency $\omega_0$. It is known for a sinusoidal component-containing signal that the difference between the currents Ia and IA cannot be eliminated by PI control. The use of PR control having a high gain for variation with the frequency $\omega_0$ allows for the control that adjusts the difference to zero. Thus, the variation of the power supply bus voltage Vd can be reliably suppressed.

In this embodiment, as described above, the current Ia is passed through the NF 30 having a low gain at the oscillation frequency Fo which depends on the second capacitor C2 and the inductors L1 and L2. The component with the oscillation frequency Fo is substantially removed from the current Ia. This enables the control circuit 14 to operate without being affected by oscillation originating from the second capacitor C2 and inductors L1 and L2. Thus, the device 2 can reliably suppress the variation of the power supply bus voltage Vd. Further, there is no need to take into account the influence on the control circuit 14 when choosing the sizes of the second capacitor C2 and inductors L1 and L2. This increases the flexibility in choosing the sizes of the second capacitor C2 and inductors L1 and L2. For example, the second capacitor C2 and inductors L1 and L2 of small size can be selected.

Second Embodiment

Figure 6:
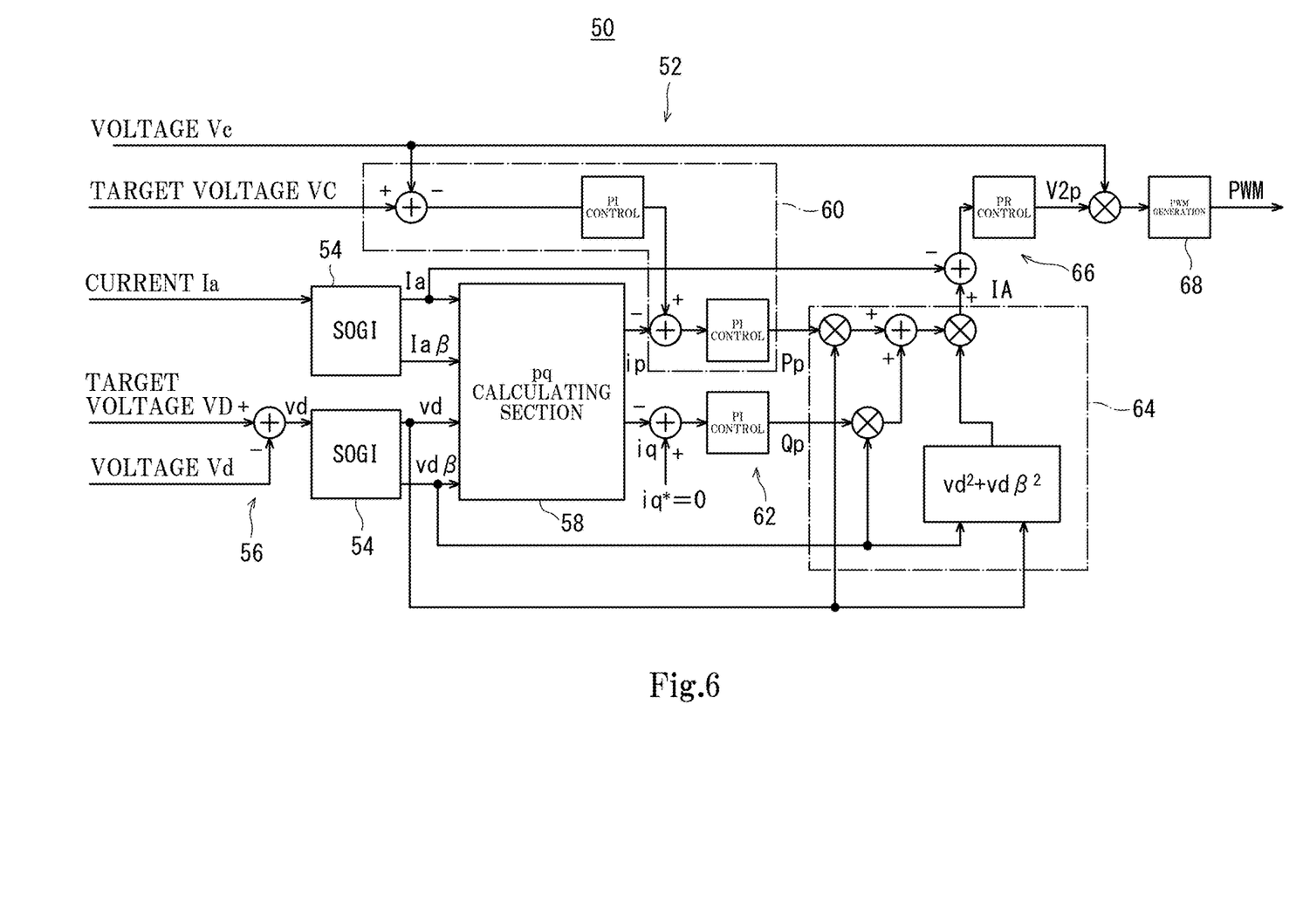
FIG. 6 is a block diagram showing the operation of a control circuit of a power conversion device according to another embodiment of the present invention.

FIG. 6 is a block diagram showing a control circuit 52 of a power conversion device 50 according to another embodiment of the present invention. As seen from FIG. 6, the control circuit 52 includes a second order generalized integrator 54 (hereinafter referred to as the "SOGI 54"), a vd extracting section 56, a pq calculating section 58, a Pp determining section 60, a Qp determining section 62, an IA calculating section 64, a V2p determining section 66, and a PWM generating section 68. The control circuit 52 differs from the control circuit 14 of FIG. 3 by including neither the NF 30 nor APF 34 but including the SOGI 54 instead of the NF 30 and APF 34. The other parts of the control circuit 52 are the same as those of the control circuit 14 of FIG. 3.

The SOGI 54 operates as a band-pass filter having a low gain for signal components with frequencies outside a predetermined frequency band. The SOGI 54 is designed to reduce the amount of signal components other than those having frequencies within a frequency band including the frequency $\omega_0$. The SOGI 54 operates as an oscillation frequency component reducing circuit that reduces the amount of a signal component with the frequency Fo.

The SOGI 54 allows the input signal to pass therethrough without changing the phase of the signal. The SOGI 54 generates an internal signal phase-shifted from the input signal by −90°, and can output the internal signal. Adjusting the gain of the SOGI 54 enables the SOGI 54 to output a signal having the same amplitude and phase as the input signal and a signal having the same amplitude as the input signal and phase-shifted from the input signal by −90°.

In this embodiment, as shown in FIG. 6, the current Ia coming from the variation compensation circuit is passed through the SOGI 54. The SOGI 54 outputs a current Ia resulting from removing given frequency components including a component with the frequency Fo from the original input current Ia, and further outputs a current Iaβ phase-shifted from the resulting current Ia by −90°. As shown in FIG. 6, the variation voltage vd is also passed through the SOGI 54. The SOGI 54 outputs a voltage vd resulting from removing given frequency components including a component with the frequency Fo from the original input voltage vd, and further outputs a voltage vdβ phase-shifted from the resulting voltage vd by −90°.

In the device 50, the method used by the control circuit 52 to control the variation compensation circuit includes the steps of: receiving the voltage Vd, the voltage Vc, and the current Ia as inputs; and generating a switch control signal. The switch control signal controls turning on and off of the switching element to adjust the voltage Vd to the predetermined target voltage VD and the voltage Vc to the predetermined target voltage VC. In this embodiment, the switch control signal is a PWM signal.

The step of generating the switch control signal includes the steps of:
(1') passing the current Ia through the SOGI 54;
(2') obtaining the variation voltage vd of the power supply bus; and
(3') passing the variation voltage vd through the SOGI 54.

The subsequent steps are the same as the steps (5) to (11) previously described.

In this embodiment, the current Ia and the voltage vd are passed through the SOGI 54. The SOGI 54 reduces the amount of signal components other than those having frequencies within a frequency band including the frequency $\omega_0$. Given signal components including a component with the frequency Fo are substantially removed from the current Ia and the voltage vd. This enables the control circuit 52 to operate without being affected by oscillation originating from the second capacitor C2 and inductors L1 and L2. The device 50 can reliably suppress the variation of the voltage Vd of the power supply bus. Further, there is no need to take into account the influence on the control circuit 52 when choosing the sizes of the second capacitor C2 and inductors L1 and L2. This increases the flexibility in choosing the sizes of the second capacitor C2 and inductors L1 and L2. For example, the second capacitor C2 and inductors L1 and L2 of small size can be selected.

The SOGI 54 can remove, from the current Ia and voltage vd, components generated due to a cause such as external noise and having frequencies lower than the frequency $\omega_0$. The control circuit 52 can operate without being affected by such noise. The device 50 can reliably suppress the variation of the voltage Vd of the power supply bus.

EXAMPLES

A power conversion device as shown in FIGS. 2 to 4 was produced. A DC voltage source and an inverter device were prepared as a power supply system for evaluation. The inventive device was connected to a power supply bus interposed between the DC voltage source and the inverter. A simulation environment for the inventive device and the power supply system was also prepared. The specifications of the inventive device (APD device) and the power supply system are shown in Table 1. As shown in Table 1, the total capacitance of the capacitors used in the inventive device is not more than 50 μF.

TABLE 1

| Specifications for Evaluation | | |
|---|---|---|
| | Item | Value |
| Power supply system | Inverter output power | 1 kW |
| | Inverter power factor | 1 |
| | Inverter output single-phase AC frequency | 50 Hz |
| | DC power supply bus voltage | 300 V |
| APD device | First capacitor C1 | 25.7 μF |
| | Second capacitor C2 | 3.5 μF |
| | Auxiliary capacitor Cc | 18.8 μF |
| | Inductors L1 + L2 | 200 μH |
| | FET turn-on resistance | 50 mΩ |
| | FET switching frequency | 100 kHz |

[Voltage Variation of Power Supply Bus]

Figure 7:
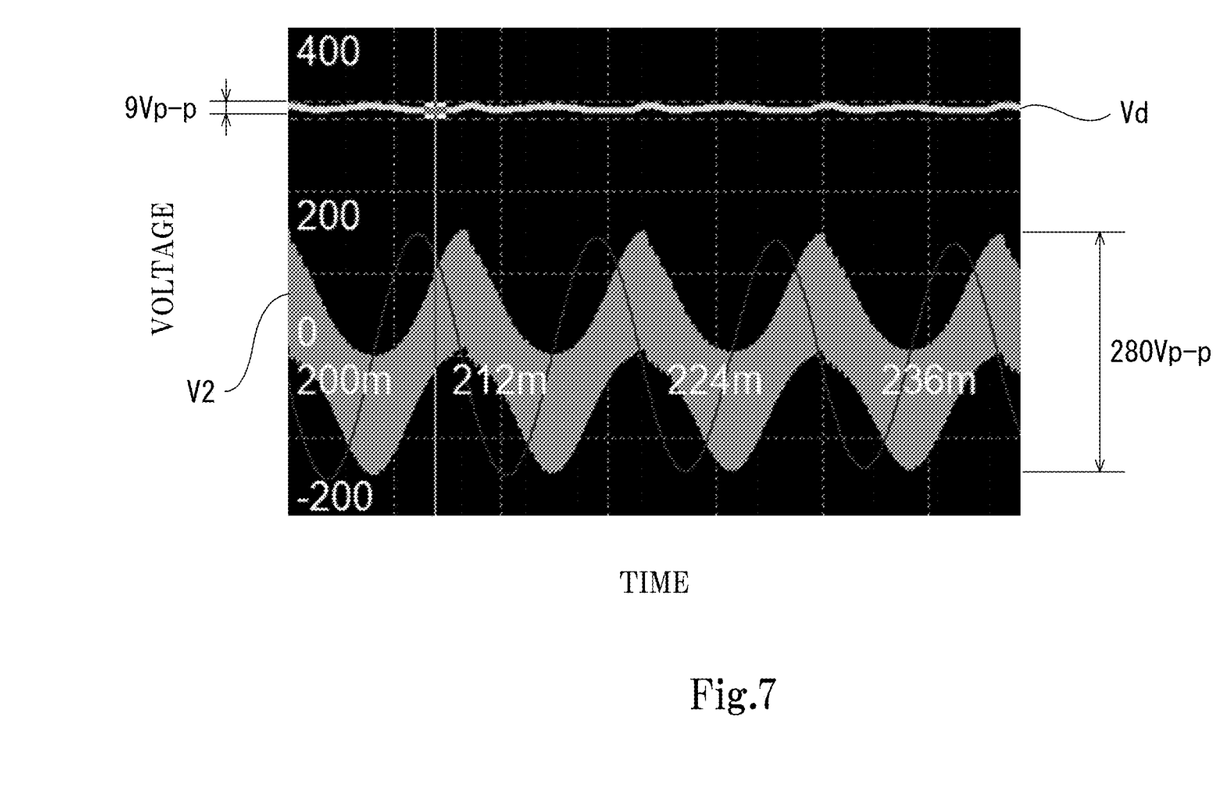
FIG. 7 is a graph showing a simulation result for the voltage of a power supply bus in the circuit of FIG. 2.

A simulation was run to examine the voltage variation of the power supply bus during operation of the inverter. The result is shown in FIG. 7. In FIG. 7, the waveform of the voltage Vd of the power supply bus and the waveform of the voltage V2 of the second capacitor C2 are shown together. As shown in the figure, the voltage of the second capacitor C2 varied to compensate for the voltage variation of the power supply bus, and the peak-to-peak variation of the voltage of the second capacitor C2 was 280 V. Consequently, the peak-to-peak variation of the voltage Vd of the power supply bus was suppressed to 9 V. This result is comparable to that obtained when an electrolytic capacitor with a capacitance of 2 mF is connected to the power supply bus in place of the inventive device.

[Auxiliary Capacitor Voltage]

Figure 8:
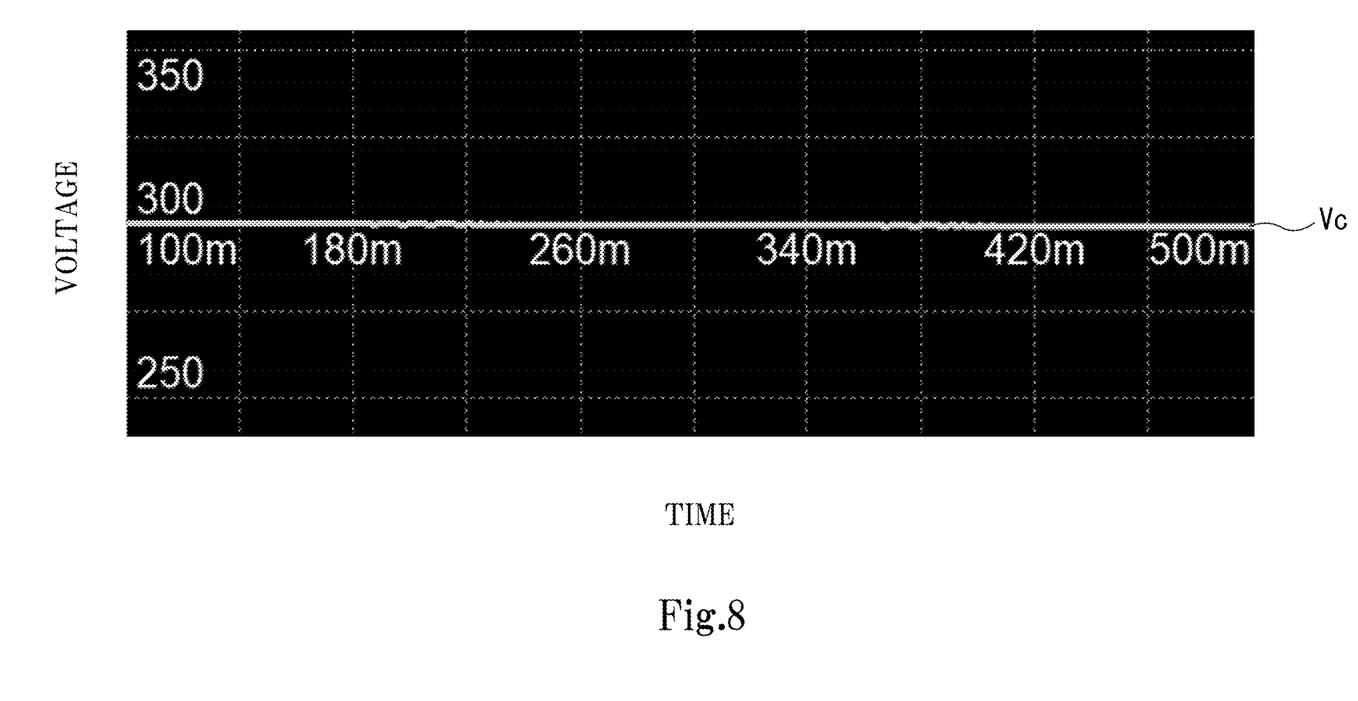
FIG. 8 is a graph showing a simulation result for the voltage of an auxiliary capacitor in the circuit of FIG. 2.

The voltage variation of the auxiliary capacitor Cc was examined along with the voltage variation of the power supply bus. The result is shown in FIG. 8. As shown in the figure, the voltage of the auxiliary capacitor Cc was successfully kept at a substantially constant level. In FIG. 8, the voltage of the auxiliary capacitor Cc shows a slight variation for a certain period. This period is when the auxiliary capacitor Cc was being charged to keep constant the voltage of the auxiliary capacitor Cc.

[Effect of NF]

Figure 9A:
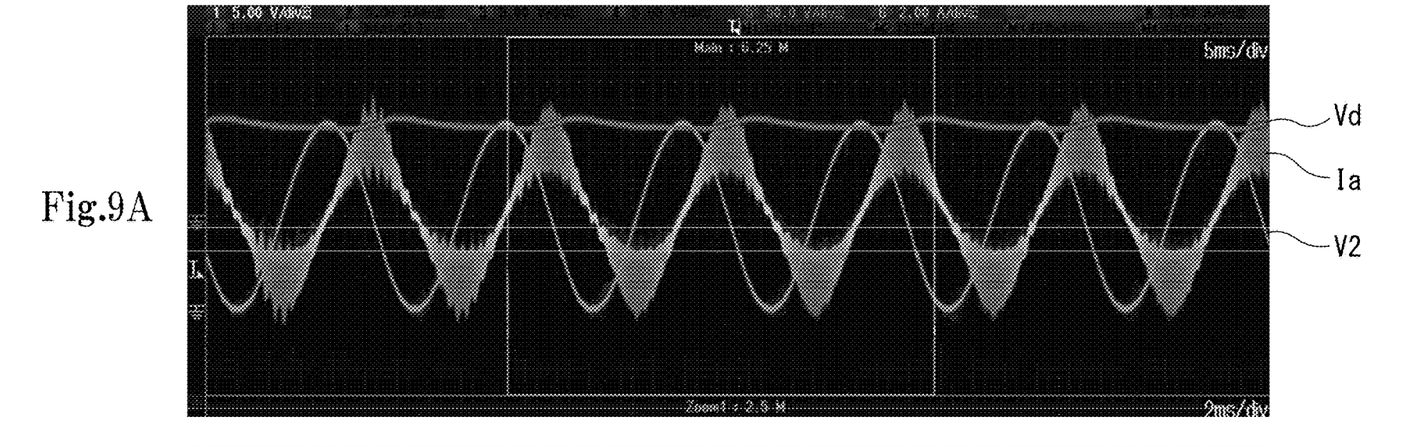
FIG. 9A is a graph showing a signal measurement result for the device of FIG. 2.
Figure 9B:
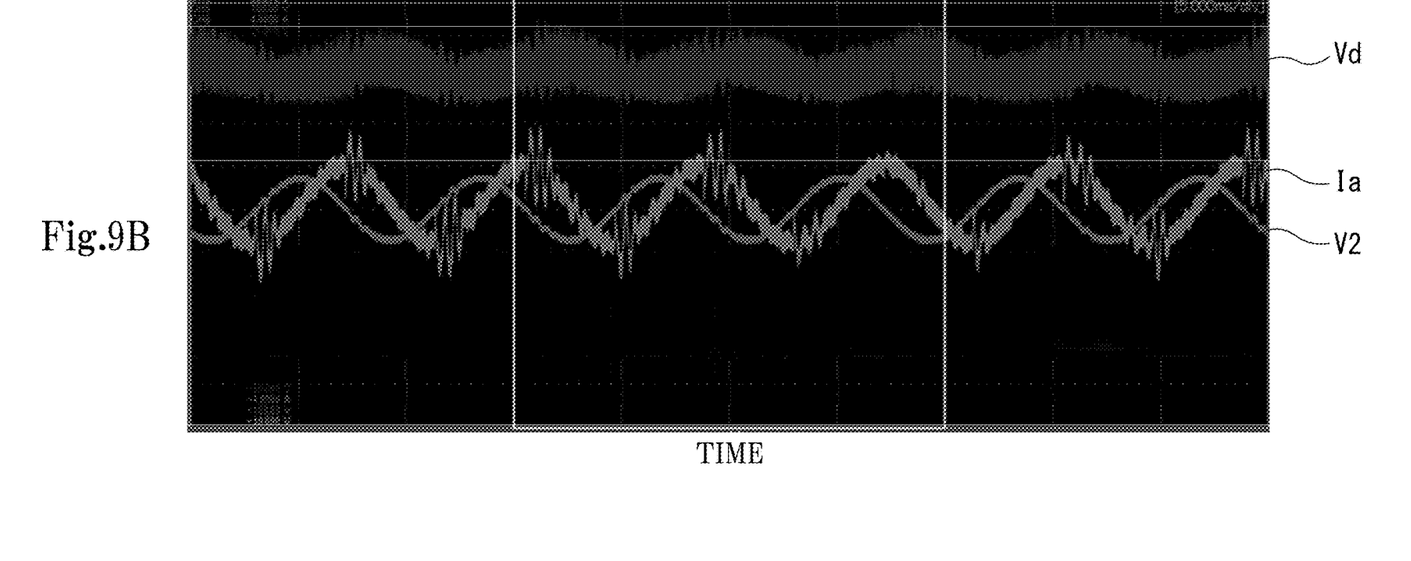
FIG. 9B is a graph showing a signal measurement result for the device of FIG. 2 with the notch filter removed from the control circuit of FIG. 3.

FIG. 9A shows the result of measuring the voltage Vd of the power supply bus, the output current Ia of the converter, and the voltage V2 of the second capacitor C2 when the inventive device was used in actual equipment. FIG. 9B shows the result of measuring the voltage Vd of the power supply bus, the output current Ia of the converter, and the voltage V2 of the second capacitor C2 when a device corresponding to the inventive device with the NF removed therefrom was used in actual equipment. In the inventive device, the converter output current Ia was less disturbed than in the device devoid of the NF. In the inventive device, the variation of the voltage Vd of the power supply bus was smaller than in the device devoid of the NF.

As seen from the foregoing description, the present invention makes it possible to reliably suppress voltage variation of a power supply bus by means of a low-capacitance capacitor. The present invention can provide a power conversion device able to suppress voltage variation of a power supply bus and having a small size and long service life. This clearly demonstrates the advantages of the present invention.

The power conversion device described above is applicable to a wide variety of power supply systems.

The foregoing description is given for illustrative purposes, and various modifications can be made without departing from the principles of the present invention.

The invention claimed is:

1. A power conversion device that suppresses voltage variation of a direct-current power supply bus in a power system involving conversion between a single-phase alternating current and a direct current, the power conversion device comprising a variation compensation circuit and a control circuit,
wherein the variation compensation circuit includes:
a first capacitor connected to the power supply bus;
a second capacitor connected in series between the first capacitor and a ground;
an auxiliary capacitor;
a converter including a switching element and having a voltage step-down function, the converter being connected to the second capacitor and the auxiliary capacitor;
a first voltmeter that measures a voltage Vd of the power supply bus;
a second voltmeter that measures a voltage Vc of the auxiliary capacitor; and
an ammeter that measures an output current Ia of the converter,
wherein the control circuit receives the voltage Vd, the voltage Vc, and the current Ia as inputs, and generates a switch control signal for controlling turning on and off of the switching element to adjust the voltage Vd to a predetermined target voltage VD and the voltage Vc to a predetermined target voltage VC,
wherein the control circuit includes an active power calculating section that calculates instantaneous active power ip in the variation compensation circuit, and
wherein the control circuit controls the voltage Vc using the instantaneous active power ip.

2. The power conversion device according to claim 1, wherein the control circuit includes:
a pq calculating section that calculates the instantaneous active power ip and instantaneous reactive power iq in the variation compensation circuit based on the voltage Vd and the current Ia;
a Pp determining section that determines instantaneous active power Pp as an intermediate manipulated variable based on the instantaneous active power ip, the voltage Vc, and the target voltage VC, the instantaneous active power Pp being for adjusting the voltage Vc to the target voltage VC; and
a Qp determining section that determines instantaneous reactive power Qp as an intermediate manipulated variable, the instantaneous reactive power Qp being for adjusting the instantaneous reactive power iq to zero, and
wherein the control circuit generates the switch control signal based on the instantaneous active power Pp and the instantaneous reactive power Qp.

3. The power conversion device according to claim 2, wherein the control circuit further includes:
an IA calculating section that calculates an output current IA of the converter based on the instantaneous active power Pp and the instantaneous reactive power Qp;
a V2p determining section that determines a voltage V2p of the second capacitor as an intermediate manipulated variable based on the calculated current IA and the current Ia, the voltage V2p being for adjusting a difference between the currents IA and Ia to zero; and
a switch control signal generating section that generates the switch control signal based on the voltage V2p and the voltage Vc.

4. The power conversion device according to claim 3, wherein the V2p determining section includes a proportional resonant control section having a peak gain for variation with a frequency wo which is twice a frequency of the single-phase alternating current.

5. The power conversion device according to claim 1, wherein the control circuit further includes an oscillation frequency component reducing circuit that reduces the amount of a component with an oscillation frequency which depends on the second capacitor and the converter,
wherein the current Ia coming from the variation compensation circuit is passed through the reducing circuit, and
wherein an output from the reducing circuit is used as the current Ia to generate the switch control signal.

6. The power conversion device according to claim 5, wherein the reducing circuit is a notch filter or a second order generalized integrator.

7. The power conversion device according to claim 1, wherein the converter is an inverter or a step-down chopper.

8. A method of controlling a variation compensation circuit for a power conversion device that suppresses voltage variation of a direct-current power supply bus in a power system involving conversion between a single-phase alternating current and a direct current, wherein the variation compensation circuit includes: a first capacitor connected to the power supply bus; a second capacitor connected in series between the first capacitor and a ground; an auxiliary capacitor; a converter including a switching element and having a voltage step-down function, the converter being connected to the second capacitor and the auxiliary capacitor; a first voltmeter that measures a voltage Vd of the power supply bus; a second voltmeter that measures a voltage Vc of the auxiliary capacitor; and an ammeter that measures an output current Ia of the converter, the method comprising the steps of:

(A) receiving the voltage Vd, the voltage Vc, and the current Ia as inputs; and (B) generating a switch control signal for controlling turning on and off of the switching element to adjust the voltage Vd to a predetermined target voltage VD and the voltage Vc to a predetermined target voltage VC, wherein in the step (B), instantaneous active power ip in the variation compensation circuit is calculated based on the voltage Vd and the current Ia, and the voltage Vc is controlled using the instantaneous active power ip.

9. The method according to claim 8, wherein the step (B) includes the steps of:

(B1) calculating the instantaneous active power ip in the variation compensation circuit based on the voltage Vd and the current Ia;

(B2) determining instantaneous active power Pp as an intermediate manipulated variable based on the instantaneous active power ip, the voltage Vc, and the target voltage VC, the instantaneous active power Pp being for adjusting the voltage Vc to the target voltage VC;

(B3) calculating instantaneous reactive power iq in the variation compensation circuit based on the voltage Vd and the current Ia; and (B4) determining instantaneous reactive power Qp as an intermediate manipulated variable based on the instantaneous reactive power iq, the instantaneous reactive power Qp being for adjusting the instantaneous reactive power iq to zero, and wherein the switch control signal is generated based on the instantaneous active power Pp and the instantaneous reactive power Qp.

10. The method according to claim 9, wherein the step (B) further includes the steps of:

(B5) calculating an output current IA of the converter based on the instantaneous active power Pp and the instantaneous reactive power Qp;

(B6) determining a voltage V2p of the second capacitor as an intermediate manipulated variable based on the calculated current IA and the current Ia, the voltage V2p being for adjusting a difference between the currents IA and is to zero; and (B7) generating the switch control signal based on the voltage V2p and the voltage Vc.

11. The method according to claim 10, wherein in the step (B6), proportional resonant control is performed, and the proportional resonant control has a peak gain for variation with a frequency wo which is twice a frequency of the single-phase alternating current.

12. The method according to claim 8, further comprising the step of:

(C) after receiving the current Ia as an input in the step (A), passing the received current Ia through an oscillation frequency component reducing circuit that reduces the amount of a component with an oscillation frequency which depends on the second capacitor and the converter, wherein in the step (B), the current passed through the reducing circuit is used as the current Ia.

13. The method according to claim 12, wherein the oscillation frequency component reducing circuit is a notch filter or a second order generalized integrator.

* * * * *